United States Patent

[11] 3,628,651

[72] Inventor Willem Wolzak
   Landsmeer, Netherlands
[21] Appl. No. 36,795
[22] Filed May 13, 1970
[45] Patented Dec. 21, 1971
[73] Assignee Stork Amsterdam N.V.
   Amstelveen, Netherlands
[32] Priority May 14, 1969
[33] Netherlands
[31] 6907412

[54] DEVICE FOR TILTING ADVANCING CONTAINERS
   3 Claims, 5 Drawing Figs.
[52] U.S. Cl. .................................. 198/33 AD, 198/165
[51] Int. Cl. .................................. B65g 47/24

[50] Field of Search .......................... 198/33 AD, 165; 193/43 R, 43 C, 43 D

[56] References Cited
   UNITED STATES PATENTS
   3,312,326  4/1967  Huppenthal .............. 198/33 AD Primary Examiner—Evon C. Blunk
Assistant Examiner—Alfred N. Goodman
Attorney—Waters, Roditi, Schwartz and Nissen ABSTRACT: A device for tilting consecutively a row of advancing containers from an upright to a lying position by applying an accelerating force in the feed direction to the bottom of the containers so that the containers fall backwards during their uninterrupted travel.

DEVICE FOR TILTING ADVANCING CONTAINERS

BACKGROUND OF THE PRIOR ART

The invention relates to a device for tilting advancing containers, like tins or glass jars with an almost flat or convex bottom, from an upright position into a horizontal position, comprising a feed path with an endless conveyor passing over a number of sprocket wheels, said conveyor being in contact with the bottom of the containers to be tilted in order to advance them at the desired velocity.

Such a device and various variants thereof are known in which mostly the containers are tilted by guiding them around a bend. It has however appeared that in this manner it is not possible to obtain under all circumstances a satisfactory solution for the problem how to chance continuously the position of a large number of containers per time unit. The necessity to increase the speed at which the tilting movement is effected as a consequence of the ever growing capacity of the apparatus in which containers filled with, e.g., foodstuffs are treated.

Such an apparatus may, e.g., consist of a device for pasteurizing or sterilizing milk, vegetables or other foodstuffs packed in tins or glass jars. In the inlet and/or outlet of such an apparatus a device for tilting the advancing containers may be required.

SUMMARY OF THE INVENTION

It is an object of the invention to provide a device which allows for a great output, without the containers being exposed to great forces or considerable accelerations or slowdowns.

This object is attained according to the invention in that
the feed conveyor only contacts the central area of the bottom of the container;
a discharge conveyor is provided moving at a speed higher than that of the feed conveyor, said discharge conveyor being in contact with the marginal areas situated on either side of the central bottom area of each container;
the first part of the discharge conveyor overlaps the end of the feed conveyor.

Due to these features, at the end of the feed path, the bottom is as it were drawn from under each container so that same tips backwards in such a manner that it is brought from an upright position into a horizontal position.

According to an embodiment the discharge conveyor consists of two inclined faces disposed in front of one the other in a V-shaped configuration and extending partially under the level of the supply path and for the rest thereabove. The application of this V-shaped configuration provides as it were a gutter in which each tilted container is received so that it cannot move sidewise or land in an oblique position.

DESCRIPTION OF A PREFERRED EMBODIMENT

Figure 1:
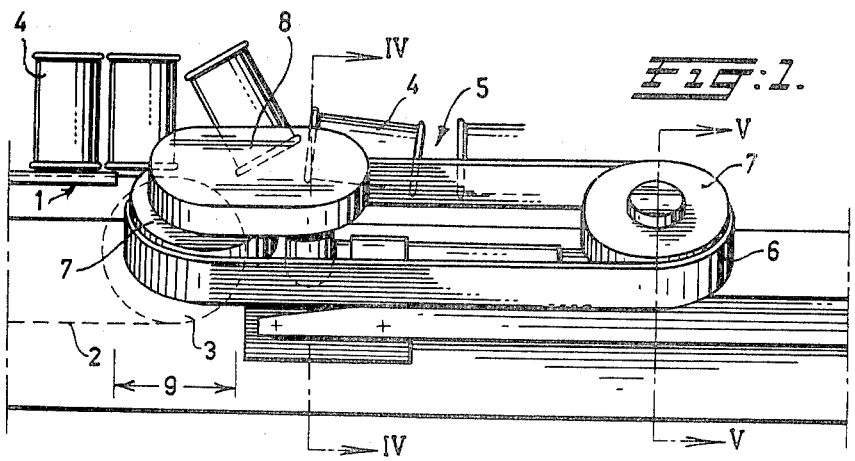
FIG. 1 is a side elevation of a tilting device in which some tins are depicted in various positions which they consecutively assume.
Figure 2:
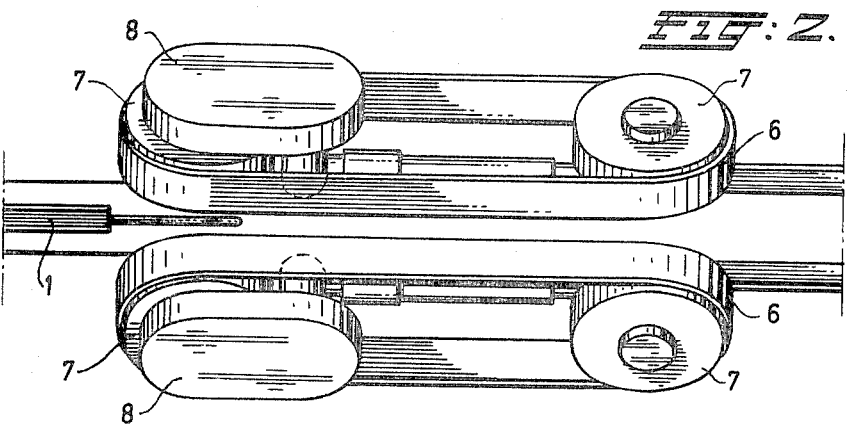
FIG. 2 is a plan view of the device according to FIG. 1.
Figure 4:
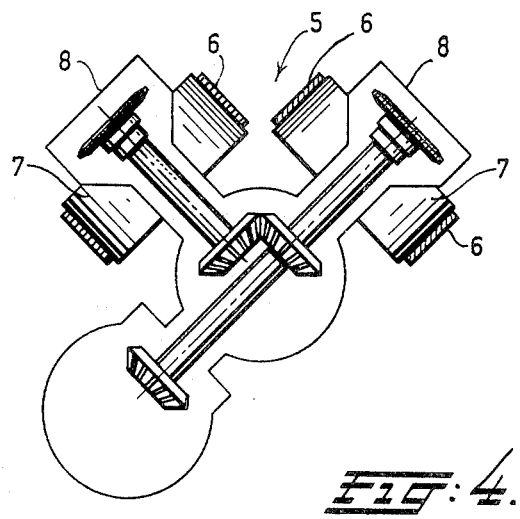
Figure 5:
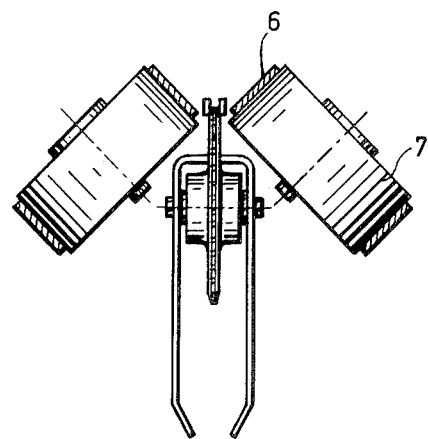

The FIGS. 4 and 5 show a section according to the lines IV—IV, V—V, respectively in FIG. 1.

The device consists of a feed path 1 provided with an endless conveyor 2, e.g., embodied as a flat link chain passing over some sprocket wheels 3, one of which is only shown. The conveyor 2 is rather narrow, so that it is only in contact with the central area of the bottom of the containers 4 (see FIG. 3). These containers are supplied in an upright position by the feed path 1 (see FIG. 1).

Figure 3:
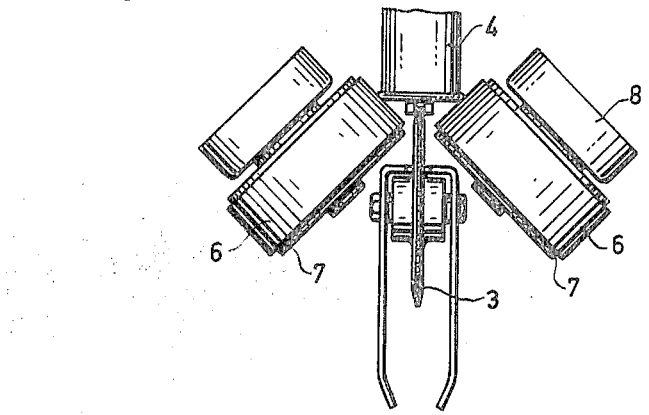
FIG. 3 is a view as seen from the left of FIG. 1.

A discharge conveyor 5 adjoins the feed path 1 and consists of two inclined faces which are arranged in a V-shaped configuration. These inclined faces are constituted by two endless belts 6 passing over two pairs of rollers 7. As is best seen in FIG. 3, two belts 6 extends partially below the level of the feed path 1 and for the rest thereabove. The rollers 7 have a center line which makes an angle with the axis of the final sprocket 3 of the feed path 1.

In the embodiment depicted the return rollers are at an angle of 45° with the horizontal plane and they are provided with a drive 8 consisting of a chain transmission which is centrally driven from a location situated slightly beyond the area 9 in which the feed path overlaps the discharge conveyor 5 (see FIG. 4). The drive of the belts 6 is effected at a speed higher than that of the conveyor 2 of the feed path 1. The effect thereof is visible in FIG. 1.

The containers 4 are supplied at a uniform velocity along the path 1 and on reaching the area of overlap 9 they will by their marginal portions on either side of the central area of their bottom come into contact with the faster moving belts 6, so that the container is as it were drawn from under and is tilted backwards to land finally in a horizontal position between the two belts 6 (see FIG. 5).

The discharge conveyor 5 is supported in such a manner that the two belts 6 can be vertically moved up and down in order to obtain a smaller or larger supporting face above the level of the feed path. It is also possible to move the belts 6 apart in a horizontal direction, transverse to the direction in which the containers 4 are supplied, in order to obtain a narrower or wider receiving gutter and to allow in this way an adaptation to the size of the containers 4. In spite of the overlapping position of the end of the feed path and the beginning of the discharge conveyor no problems occur as to the drive of the various rollers since on the underside there is plenty place for driving members.

It should be noted that the invention is not limited to the application of a discharge conveyor consisting of two endless belts. It is conceivable that this discharge conveyor is constituted by a V-shaped rim of a wheel with a great diameter on which the same tilting operation as depicted in FIG. 1 will be effected. The application of endless belts 6 is advantageous in that the construction is spatially very compact, while moreover the containers land on a yielding surface so that there is hardly any risk of damage.

Experiments have demonstrated that with the tilting device according to the invention very great velocities can be applied and that a considerable treatment capacity can be achieved which can be stepped up to double the capacity with respect to that which so far was possible, without any risk of damage or other disturbance in tilting.

What is claimed is:

1. A device for tilting advancing containers, like tins or glass jars from an upright position into a horizontal position, comprising a feed path with an endless conveyor in contact with the bottom of the containers to be tilted in order to advance them at the desired velocity, the improvement consisting in that: the feed conveyor only contacts a narrow diametrical zone of the bottom of the containers, a discharge conveyor is provided moving at a speed higher than that of the feed conveyor, said discharge conveyor consisting of two inclined faces arranged with respect to one another so as to form a V-shaped configuration, and being in contact with the marginal areas situated on either side of said diametrical zone at the bottom of each container; and the first part of the discharge conveyor overlaps the end of the feed conveyor.

2. A device according to claim 1, wherein the inclined faces are constituted by two endless belts passing over two pairs of return rollers with a centerline which makes an angle with the sprocket wheel axes of the feed conveyor.

3. A device according to claim 2, wherein the return rollers of the discharge conveyor make an angle of 45° with the horizontal plane, while their width above the level of supply is equal to the half diameter of the containers.

* * * * *